(12) United States Patent
Ganesan

(10) Patent No.: US 10,714,221 B2
(45) Date of Patent: Jul. 14, 2020

(54) FLOATING NUCLEAR REACTOR PROTECTION SYSTEM

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 395 days.

(21) Appl. No.: 15/807,182

(22) Filed: Nov. 8, 2017

(65) Prior Publication Data

US 2019/0139656 A1     May 9, 2019

Related U.S. Application Data

(63) Continuation-in-part of application No. 15/807,049, filed on Nov. 8, 2017.

(51) Int. Cl.
| | |
|---|---|
| *G21C 11/04* | (2006.01) |
| *F41H 5/24* | (2006.01) |
| *G21D 1/00* | (2006.01) |
| *E04H 9/06* | (2006.01) |
| *G21C 13/024* | (2006.01) |
| *G21C 15/18* | (2006.01) |
| *G21C 15/12* | (2006.01) |

(52) U.S. Cl.
CPC ............ *G21C 11/04* (2013.01); *E04H 9/06* (2013.01); *F41H 5/24* (2013.01); *G21D 1/00* (2013.01); *G21C 13/024* (2013.01); *G21C 15/12* (2013.01); *G21C 15/18* (2013.01)

(58) Field of Classification Search
CPC ...... G21C 11/04; G21C 13/02; G21C 13/024; G21D 1/00; E04H 9/04; E04H 9/06; F41H 5/24
See application file for complete search history.

(56) References Cited

U.S. PATENT DOCUMENTS

| | | | | |
|---|---|---|---|---|
| 4,277,309 A | * | 7/1981 | Schabert | G21C 13/00 376/273 |
| 4,763,457 A | * | 8/1988 | Caspe | E04B 1/98 52/167.1 |
| 8,867,691 B1 | * | 10/2014 | Root | G21D 1/00 376/277 |
| 9,378,855 B2 | | 6/2016 | Ganesan | |
| 9,396,823 B2 | | 7/2016 | Ganesan | |
| 9,502,143 B2 | | 11/2016 | Ganesan | |

FOREIGN PATENT DOCUMENTS

DE     102011106573 A1 * 9/2012 ............ E04H 9/04

* cited by examiner

*Primary Examiner* — Sharon M Davis
(74) *Attorney, Agent, or Firm* — Dennis L. Thomte; Thomte Patent Law Office LLC

(57) ABSTRACT

A protection system is provided for protecting a nuclear reactor positioned on a barge which is floating in the water of a tank. The system includes one or more cones which are positioned on the upper end of the nuclear reactor which will disintegrate and deflect an aircraft or missile striking the same. The system also includes structure which permits the barge to move downwardly in the tank upon an aircraft or missile strike to reduce the impact force of the strike.

5 Claims, 6 Drawing Sheets

FLOATING NUCLEAR REACTOR PROTECTION SYSTEM

CROSS REFERENCE TO RELATED APPLICATION

This is a Continuation-In-Part Application of application Ser. No. 15/807,049 filed Nov. 8, 2017, entitled FLOATING NUCLEAR POWER REACTOR WITH A SELF-COOLING CONTAINMENT STRUCTURE AND AN EMERGENCY HEAT EXCHANGE SYSTEM.

BACKGROUND OF THE INVENTION

Field of the Invention

This invention relates to a floating nuclear power reactor. More particularly this invention relates to a floating nuclear power reactor including a barge which is floatably positioned in the interior of a large water-filled tank or body of water and wherein the nuclear power reactor is positioned on the barge. Even more particularly, the invention relates to a protection system for a floating nuclear power reactor to protect the nuclear reactor from an aircraft strike or a missile strike. Additionally, the protection system of this invention includes structure to reduce the impact forces of an aircraft strike or a missile strike.

Description of the Related Art

Applicant has received U.S. Pat. Nos. 9,378,855; 9,396,823; and 9,502,143 relating to nuclear reactors positioned in a body of water to be able to flood and cool the nuclear reactor in the event of overheating or over pressurization of the nuclear reactor. In Applicant's latest invention shown and described in the co-pending application Ser. No. 15/807,049 filed Nov. 8, 2017, a suspension system is described for suspending and stabilizing a barge which is floating in a large water tank. That system is incorporated herein which further enhances the protection of the nuclear reactor in the event of an aircraft strike or a missile strike.

In Applicant's co-pending patent application Ser. No. 15/807,049 filed Nov. 8, 2017, the upper end of the barge, having the nuclear reactor mounted thereon, is exposed to an aircraft strike or a missile strike. The instant invention is to provide a protection system for the nuclear power reactor of the co-pending application and to provide protection to other exposed nuclear power reactors of different designs.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear reactor is disclosed. The floating nuclear reactor of this invention includes a tank, which may be rectangular, having a bottom wall, an upstanding first end wall, an upstanding second end wall, an upstanding first side wall and an upstanding second side wall. Each of the first end wall, the second end wall, the first side wall and the second side wall of the tank have an outer side, an inner side, a lower end and an upper end. The tank is partially buried in the ground with the tank having water therein.

A barge is floatably positioned in the tank with the barge having a bottom wall, a first end wall, a first side wall, a second side wall and an open second end. A nuclear reactor is positioned on the barge. At least one suspension assembly, and preferably two suspension assemblies, connect the first end wall of the barge to the first end wall of the tank. At least one suspension assembly, and preferably two suspension assemblies, connect the first side wall of the tank to the first side wall of the barge. At least one suspension assembly, and preferably two suspension assemblies, connect the second side wall of the tank to the second side wall of the barge. At least one suspension assembly, and preferably two suspension assemblies, connect the second end wall of the barge to the second end wall of the tank.

The suspension assemblies permit the barge to move upwardly and downwardly with respect to the tank while maintaining the barge in a level condition. The suspension assemblies permit the barge to move downwardly if struck by a missile or aircraft to lessen the impact thereof.

The nuclear reactor is positioned in the tank so as to close the open second end of the barge. The nuclear reactor may also be positioned in a body of water. The nuclear reactor includes a first containment member which has a cylindrical body portion, a hemi-spherical upper end and a hemi-spherical lower end. The first containment member is comprised of stainless steel or other suitable material. The first containment member is positioned at the open end of the barge with the sides of the containment member being in engagement with the ends of the sidewalls of the barge so as to close the open end of the barge. The positioning of the first containment member causes the outer side of the first containment member to be in contact with the water in the tank. The first containment member defines a sealed interior compartment.

The first containment member has a hatch or door mounted thereon at the lower end thereof which selectively closes an opening in the first containment member. The first containment member also has a pipe extending from the lower end thereof which is in fluid communication with the interior compartment thereof. A normally closed one-way valve is imposed in the pipe.

A reactor vessel is positioned in the interior compartment of the first containment member. The nuclear reactor of the co-pending application has a unique cooling system for the nuclear reactor which does not form a part of this invention.

A heat exchanger is positioned adjacent the first containment member and includes a body section, an upper section and a lower section. The heat exchanger includes an outer wall member or second containment member which is comprised of metal. A vessel is positioned within the second containment member of the heat exchanger. The vessel has an interior compartment which is filled with fluid. The heat exchanger is connected to a turbine or other device.

The suspension assemblies also permit the barge to move downwardly in the tank in the event of an aircraft strike, a missile strike or an earthquake to reduce the impact forces on the barge and nuclear reactor.

A hollow steel conical-shaped member is mounted on the upper end of the first containment member of the nuclear reactor. A hollow steel conical-shaped member is also mounted on the upper end of the heat exchanger. If an aircraft or a missile should strike either of the conical-shaped members, the conical-shaped members would cause the disintegration of the aircraft or missile and would deflect the same.

A roof is positioned over the upper end of the barge which hides the location of the nuclear reactor and heat exchanger from view so that an aircraft attempting to strike either the nuclear reactor or the heat exchanger will not know the precise position of those structures on the barge.

In the preferred embodiment of the invention, the interior of the conical-shaped members on the upper ends of the nuclear reactor and the heat exchanger will be filled with a material which acts as an impact absorbing member.

It is therefore a principal object of the invention to provide a floating nuclear reactor protection system.

A further object of the invention is to provide a conical-shaped member on the upper end of the nuclear reactor which will cause an aircraft or missile to disintegrate upon impacting the conical-shaped member;

Yet another object of the invention is to provide a protection system for a floating nuclear reactor which includes a roof over the protection system.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378,855; 9,396,823; and 9,502,143 relating to floating nuclear power reactors. Applicant incorporates the disclosure of the above identified patents in their entirety by reference thereto to complete this disclosure if necessary.

Figure 1:
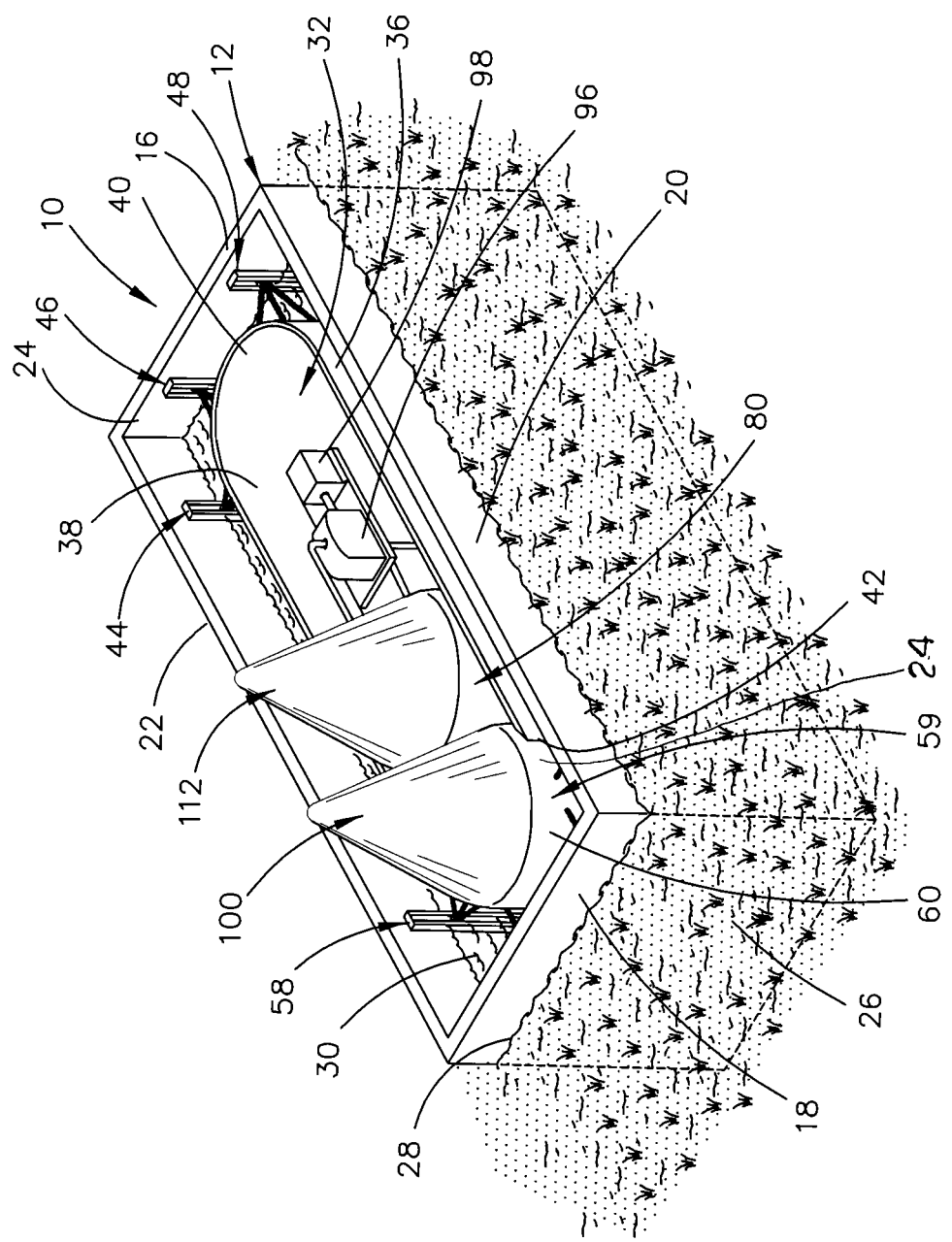
FIG. 1 is a perspective view of a floating nuclear power reactor wherein the nuclear reactor confinement member and the containment member of the heat exchanger have a conical-shaped member on the upper ends thereof.
Figure 2:
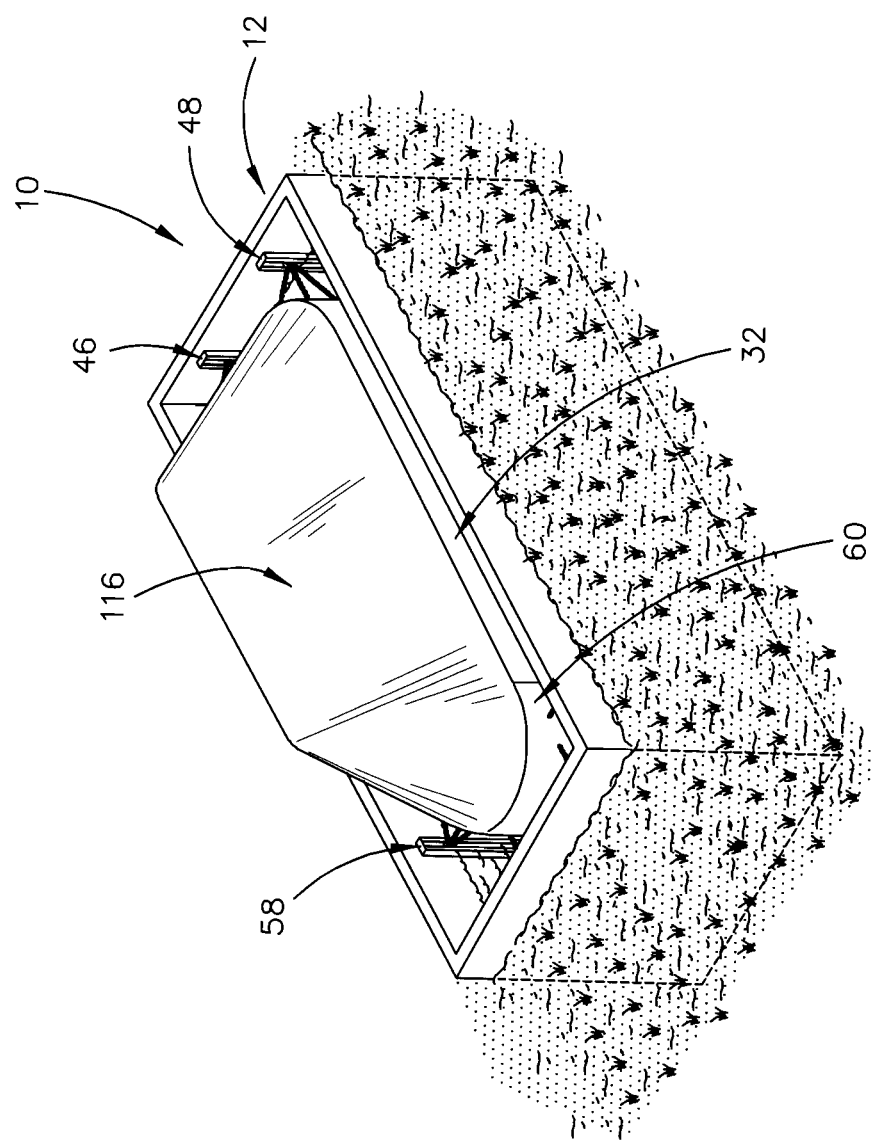
FIG. 2 is a perspective view similar to FIG. 1 except that a roof structure is positioned over the nuclear reactor, the heat exchanger and the barge.

The floating nuclear reactor of this invention is referred to generally by the reference numeral 10. The nuclear reactor 10 floats in a concrete tank 12 having a bottom wall 14, a first end wall 16, a second end wall 18, a first side wall 20, a second side wall 22 and an open upper end 24. Tank 12 is buried in the ground 26 as seen in FIG. 1 so that the open upper end 24 of tank 12 is at or above ground level 28. The tank 12 is partially filled with water 30 from a source of water. Preferably the water 30 is gravity fed to the tank 12. The tank 12 may be completely buried in the ground.

The numeral 32 refers to a barge-like vessel which floats in the tank 12. Barge 32 includes a bottom wall 34, a first side wall 36, a second side wall 38, a semi-circular end wall 40 and an open end 41 at the ends 42 and 43 of side walls 36 and 38 respectively. Barge 32 is comprised of a metal material such as stainless steel, steel, iron, aluminum or other suitable material. Barge 32 is supported in tank 12 by a plurality of upper suspension assemblies 44, 46, 48, 50, 52, 54, 56 and 58 which extend between the barge 32 and the tank 12 as will be described in detail hereinafter. Barge 32 is also supported in tank 12 by eight lower suspension assemblies, identical to suspension assemblies 44, 46, 48, 50, 52, 54, 56 and 58, which are positioned below suspension assemblies 44, 46, 48, 50, 52, 54, 56 and 58.

The numeral 59 refers to a nuclear reactor which is positioned in barge 32 so as to close the open end 41 of barge 32 as will be explained in detail hereinafter. Reactor 59 includes an upstanding containment member 60 which has a cylindrical body portion 62, a hemi-spherical upper end 64 and a hemi-spherical lower end 66. Containment member 60 is comprised of stainless steel or other suitable material. Containment member 60 is positioned at the open end 41 of barge 32 with the sides of containment member 60 being in engagement with the ends 42 and 43 of side walls 36 and 38 respectively of barge 32 and being secured thereto by welding or the like to close the open end 41 of barge 32. The positioning of the containment member 60 as just described causes the outer side of containment member 60 to be in contact with the water 30 in tank 12. Containment member 60 defines a sealed interior compartment 68.

Figure 3:
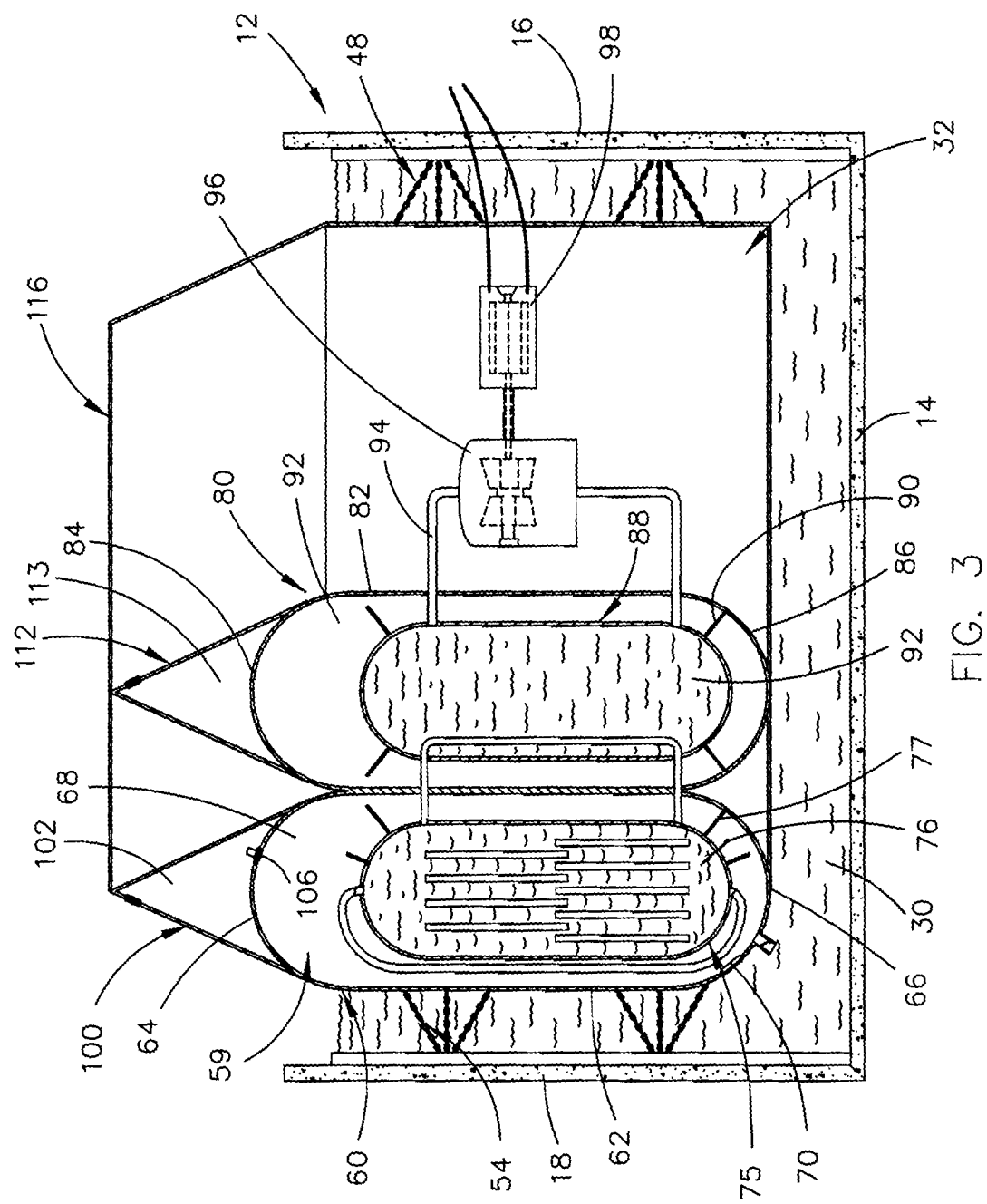
FIG. 3 is a sectional view illustrating the conical-shaped members mounted on the upper ends of the nuclear reactor and the heat exchanger thereof with a roof extending thereover.
Figure 4:
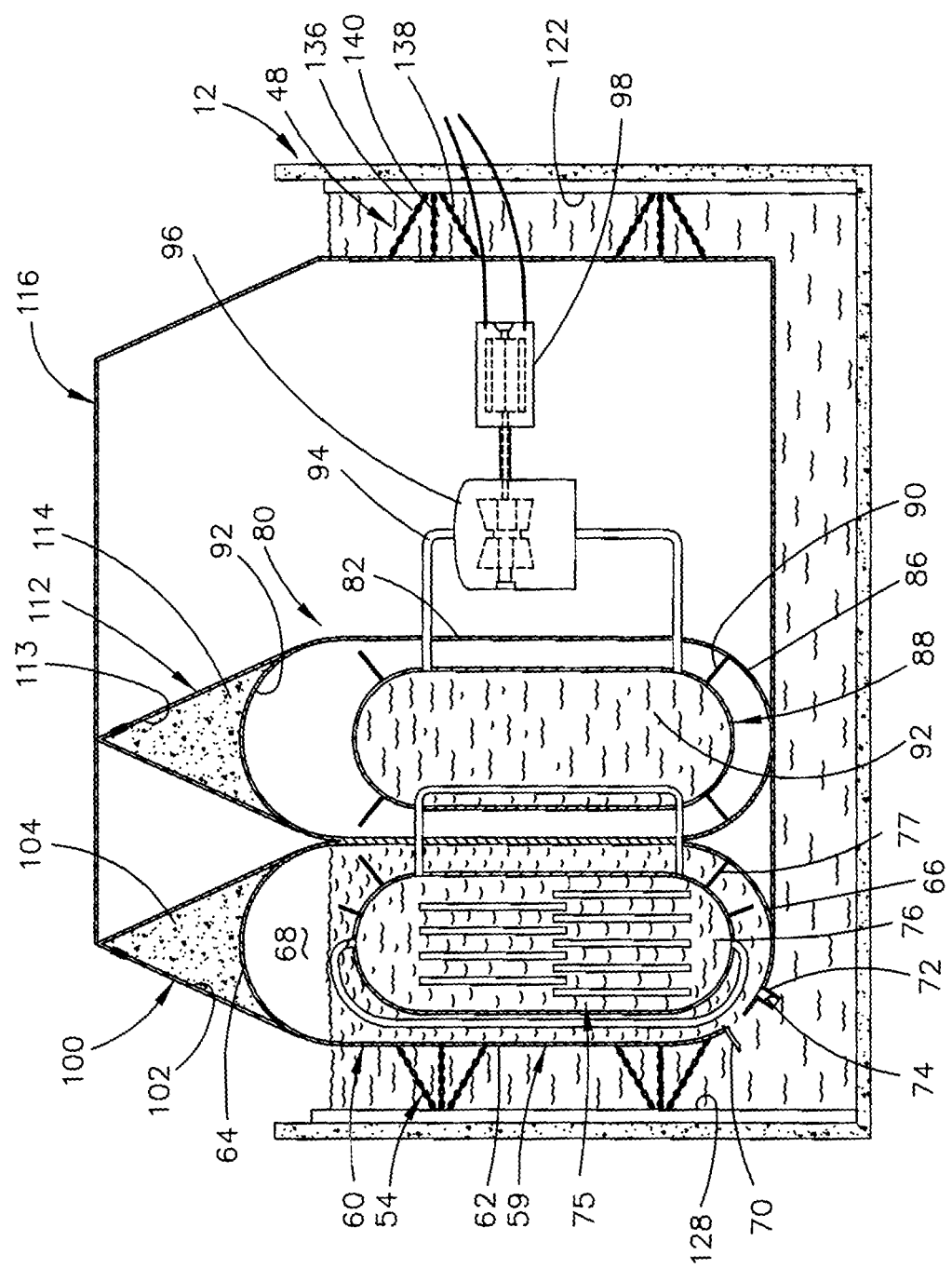
FIG. 4 is a sectional view similar to FIG. 3 except that the conical-shaped members are filled with an impact absorber material.
Figure 5:
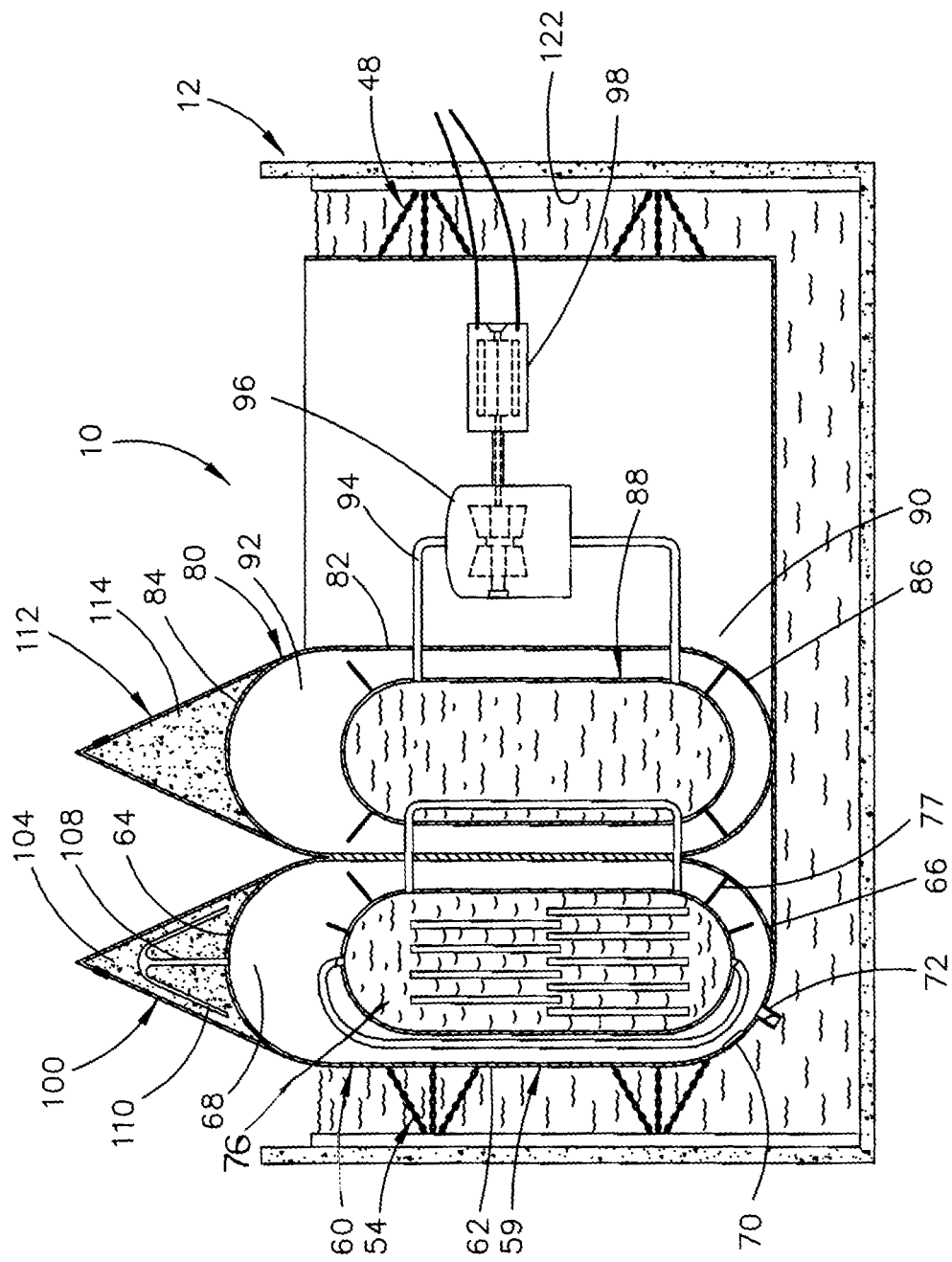
FIG. 5 is a sectional view similar to FIG. 3 except that the conical-shaped members on the nuclear reactor have a filtration material therein and a vent tube assembly therein.
Figure 6:
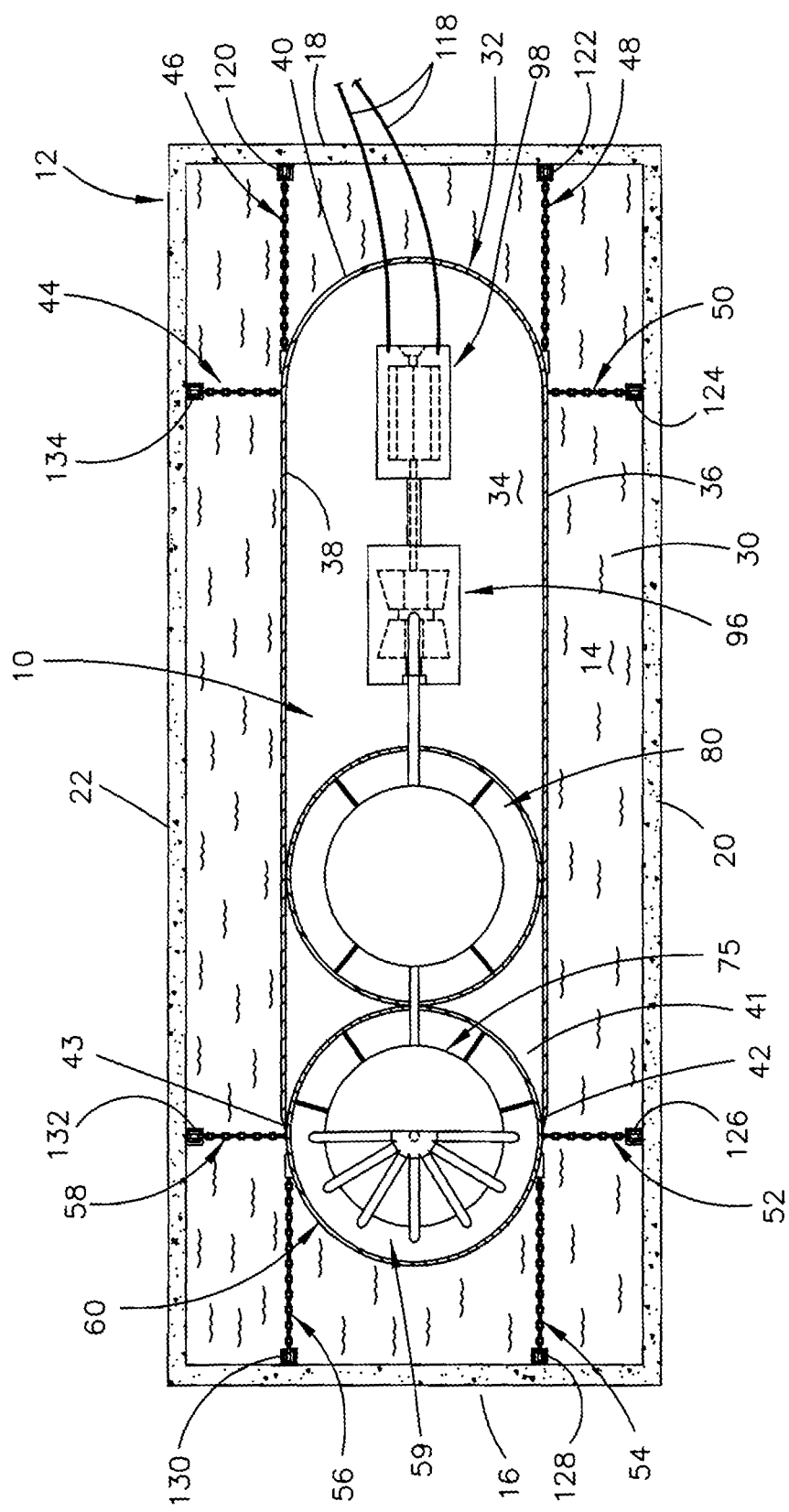
FIG. 6 is a sectional view which illustrates the suspension assemblies which suspend the barge in the water-filled tank.

Containment member 60 has a hatch 70 mounted therein as seen in FIG. 3. Containment member 60 also has a pipe 72 extending from the lower end thereof which is in fluid communication with the interior compartment 68. A normally closed one-way valve 74 is imposed in pipe 72.

A reactor vessel 75 is positioned in compartment 68 and has an interior compartment 76. Vessel 75 is supported in compartment 68 by braces 77 which extend between the exterior of reactor vessel 75 and the interior side of containment member 60 as seen in FIG. 3.

The numeral 80 refers to an upstanding heat exchanger which is positioned adjacent containment member 60 as seen in the drawings. Heat exchanger 80 includes a body section 82, an upper section 84 and a lower section 86. Heat exchanger 80 is comprised of a metal material such as stainless steel or other suitable material. A vessel 88 is positioned within heat exchanger 80 and is supported therein by braces 90 extending therebetween. Vessel 88 defines an interior compartment 92. A tube 94 interconnects the reactor vessel 75 and the vessel 88 of heat exchanger 80 as seen in the drawings. The heat exchanger 80 is connected to a turbine 96 or other device which is connected to a generator 98 or other structure.

A hollow metal cone 100 is mounted on the hemi-spherical upper end 64 of containment member 60. Cone 100 is comprised of stainless steel, steel or other suitable material. Cone 100 has an interior compartment 102 which is preferably filled with a filter material 104 which not only may serve as a filtration bed but serves as an impact absorber should the cone 100 be struck by an aircraft or a missile. The cone 100, if struck by an aircraft or missile, will disintegrate or tear apart the aircraft or missile and deflect the aircraft or missile away from the cone 100. An outlet pipe 106 may be provided in the upper end of containment member 60 to permit steam or the like to pass upwardly therethrough onto the filtration material 104.

The cone 100 may also have a discharge tube assembly 108 extending upwardly from pipe 106 and which has discharge tubes 110 extending downwardly and outwardly from the upper end of tube 108.

A metal cone 112 extends upwardly from the upper end of heat exchanger 80 and is filled with an impact absorbing material 114. Cone 112, if struck by an aircraft or missile, will disintegrate the aircraft or missile in the same manner as the cone 100.

A roof 116 extends over the cones 100, 112 and the barge 32 to hide the reactor 59 and the heat exchanger 80 from view. Thus, if an aircraft is attempting to strike the reactor 59, the pilot of the aircraft will not be able to determine the exact location of the reactor 59.

A pair of vertically disposed guide tracks or channels 120 and 122 are secured to the inner side of end wall 18. A pair of vertically disposed guide tracks or channels 124 and 126 are secured to the inner side of side wall 20. A pair of vertically disposed guide tracks or channels 128 and 130 are secured to the inner side of end wall 16. A pair of vertically disposed guide tracks or channels 132 and 134 are secured to the inner side of side wall 22. Each of the guide tracks 120, 122, 124, 126, 128, 130, 132 and 134 have an upper wheel and a lower wheel vertically movable therein. The guide tracks 134, 120, 122, 124, 126, 128, 130 and 132 form a part of the suspension assemblies 44, 46, 48, 50, 52, 54, 56 and 58 respectively.

In as much as the suspension assemblies 44, 46, 48, 50, 52, 54, 56 and 58 are identical except for length, only suspension assembly 48 will be described in detail. Suspension assembly 48 includes an upper chain member 136, a lower chain member 138 and an intermediate chain member 140. The outer ends of chain members 136, 138 and 140 are secured to the upper wheel in guide track 122. The inner ends of chain members 136, 138 and 140 are secured to the barge 32. As seen, upper chain member 136 extends upwardly and inwardly from guide track 122 to barge 32. As also seen, lower chain member 138 extends downwardly and inwardly from guide track 122 to barge 32. Further, as seen, intermediate chain member 140 extends horizontally inwardly from guide track 122 to barge 32. The suspension assembly below suspension assembly 46 would be similarly attached to the lower wheel in guide track 122 and the barge 32. The other suspension assemblies would be attached to the guide tracks 124, 126, 128, 130, 132 and 134 and the barge 32.

The suspension assemblies 44, 50, 56 and 58 are identical. The suspension assemblies 46, 48, 54 and 56 are identical. The only difference between the suspension assemblies 44, 50, 56, 58 and the suspension assemblies 46, 48, 54 and 56 is that the suspension assemblies 46, 48, 54 and 56 are somewhat longer than the suspension assemblies 44, 50, 56 and 58. As stated in the co-pending patent application, the guide tracks or channels could be secured to the barge rather than being secured to the walls of the tank. In that embodiment, the ends of the chains of the suspension assemblies would be secured to the tank.

Although it is preferred that each of the suspension assemblies have a horizontally disposed intermediate chain member 140, the intermediate chain member 140 may be omitted in some situations.

If an aircraft or a missile should strike either of the cones 100 or 112, the cones will disintegrate and deflect the aircraft or the missile to prevent damage to the nuclear reactor. Additionally, the impact absorbing material in the cones 100 and 112 will lessen the damage to the nuclear reactor. Further, if the barge 32 or the cones 100 and 112 are struck by an aircraft or missile, the suspension systems will permit the barge 32 to move downwardly in the tank 12 to lessen or absorb the impact forces of the strike.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A floating nuclear reactor, comprising:
   a tank having water therein which includes;
   (a) a horizontally disposed bottom wall having a first end, a second end, a first side and a second side;
   (b) a vertically disposed first end wall, having a first side, a second side, a lower end and an upper end, extending upwardly from said first end of said bottom wall;
   (c) a vertically disposed second end wall, having a first side, a second side, a lower end and an upper end, extending upwardly from said second end of said bottom wall;
   (d) a vertically disposed first side wall, having a first end, a second end, a lower end and an upper end, extending between said first ends of said first and second end walls;
   (e) a vertically disposed second side wall, having a first end, a second end, a lower end and an upper end, extending between said second ends of said first and second end walls;
   each of said first end wall, said second end wall, said first side wall and said second side wall of said tank having inner and outer sides;
   said tank being partially or completely buried in the ground;
   a barge, having a first end, a second end, a first side and a second side, floatably positioned in said tank;
   an upstanding nuclear reactor positioned on said barge at said second end of said barge;
   said nuclear reactor including an upstanding first containment member having an upper end and a lower end;
   a first cone mounted on said upper end of said first containment member which extends upwardly therefrom so that the apex of said cone is uppermost; and
   a roof extending over said barge and said first cone.

2. A floating nuclear reactor, comprising:
   a tank having water therein which includes;
   (a) a horizontally disposed bottom wall having a first end, a second end, a first side and a second side;

(b) a vertically disposed first end wall, having a first side, a second side, a lower end and an upper end, extending upwardly from said first end of said bottom wall;

(c) a vertically disposed second end wall, having a first side, a second side, a lower end and an upper end, extending upwardly from said second end of said bottom wall;

(d) a vertically disposed first side wall, having a first end, a second end, a lower end and an upper end, extending between said first ends of said first and second end walls;

(e) a vertically disposed second side wall, having a first end, a second end, a lower end and an upper end, extending between said second ends of said first and second end walls;

each of said first end wall, said second end wall, said first side wall and said second side wall of said tank having inner and outer sides;

said tank being partially or completely buried in the ground;

a barge, having a first end, a second end, a first side and a second side, floatably positioned in said tank;

an upstanding nuclear reactor positioned on said barge at said second end of said barge;

said nuclear reactor including an upstanding first containment member having an upper end and a lower end;

a first cone mounted on said upper end of said first containment member which extends upwardly therefrom so that the apex of said cone is uppermost;

a second containment member, having an upper end, positioned on said barge;

a second cone positioned on said upper end of said second containment member with said second cone being comprised of metal material whereby an aircraft or missile striking said second cone will be disintegrated and deflected by said second cone; and a roof extending over said barge and said first and second cones.

3. A floating nuclear reactor, comprising:

a tank having water therein which includes;

(a) a horizontally disposed bottom wall having a first end, a second end, a first side and a second side;

(b) a vertically disposed first end wall, having a first side, a second side, a lower end and an upper end, extending upwardly from said first end of said bottom wall;

(c) a vertically disposed second end wall, having a first side, a second side, a lower end and an upper end, extending upwardly from said second end of said bottom wall;

(d) a vertically disposed first side wall, having a first end, a second end, a lower end and an upper end, extending between said first ends of said first and second end walls;

(e) a vertically disposed second side wall, having a first end, a second end, a lower end and an upper end, extending between said second ends of said first and second end walls;

each of said first end wall, said second end wall, said first side wall and said second side wall of said tank having inner and outer sides;

said tank being partially or completely buried in the ground;

a barge, having a first end, a second end, a first side and a second side, floatably positioned in said tank;

an upstanding nuclear reactor positioned on said barge at said second end of said barge;

said nuclear reactor including an upstanding first containment member having an upper end and a lower end;

a first cone mounted on said upper end of said first containment member which extends upwardly therefrom so that the apex of said cone is uppermost;

a roof extending over said barge and said first cone; and a suspension system connecting said barge to said tank which permits said barge to move downwardly in said tank should an aircraft or missile strike any part of said roof to absorb some of the impact experienced by said roof.

4. A nuclear reactor, comprising:

an upstanding containment member having a nuclear reactor vessel positioned therein;

said containment member having an upper end;

a protective cone mounted on the upper end of said containment member;

said protective cone extending upwardly from said upper end of said containment member whereby the apex of said protective cone is uppermost;

said cone being comprised of a metal material whereby an aircraft or missile striking said first cone will be disintegrated and deflected by said cone; and a roof extending over said cone.

5. A nuclear reactor, comprising:

an upstanding first containment member having a nuclear reactor vessel positioned therein;

said first containment member having an upper end;

a hollow protective cone mounted on the upper end of said first containment member;

said protective cone extending upwardly from said upper end of said first containment member whereby the apex of said protective cone is uppermost;

a second containment member having an upper portion;

a hollow protective cone mounted on said upper portion of said second containment member which extends upwardly from said upper portion thereof whereby the apex of said protective cone is uppermost;

each of said protective cones being comprised of metal material whereby an aircraft or missile striking said protective cone will be disintegrated and deflected by said cone; and a roof extending over said protective cones.

* * * * *